United States Patent [19]

Healy

[11] 3,968,934
[45] July 13, 1976

[54] SPRINKLER HEAD BEARING MEANS

[76] Inventor: Mark Healy, 1738 Blossomwood Lane, Orlando, Fla. 32808

[22] Filed: July 7, 1975

[21] Appl. No.: 593,373

[52] U.S. Cl. ............................ 239/230; 239/233; 239/264; 285/351
[51] Int. Cl.² ..................... B05B 3/14; F16L 19/00
[58] Field of Search .............. 239/225, 230–233, 239/237, 239–243, 246, 251, 259, 261, 264, 601; 285/351, 353, 355; 277/59, 63, 185, 188

[56] References Cited
UNITED STATES PATENTS

| | | |
|---|---|---|
| 2,757,994 | 8/1956 | Snyder ........................... 277/188 R |
| 3,204,873 | 9/1965 | Senninger ......................... 239/230 |
| 3,743,183 | 7/1973 | Malcolm ........................ 239/230 X |
| 3,764,073 | 10/1973 | Costa et al. .................... 239/233 X |

*Primary Examiner*—John J. Love
*Assistant Examiner*—Andres Kashnikow
*Attorney, Agent, or Firm*—Duckworth, Hobby, Orman, Allen & Pettis

[57] ABSTRACT

A rotatable head sprinkler apparatus incorporating a lower bearing seal and having a swivel device for connection to a source of water under pressure, a spindle connective device and a self-powered rotary sprinkler head of the type used for irrigation of large circular areas.

16 Claims, 3 Drawing Figures

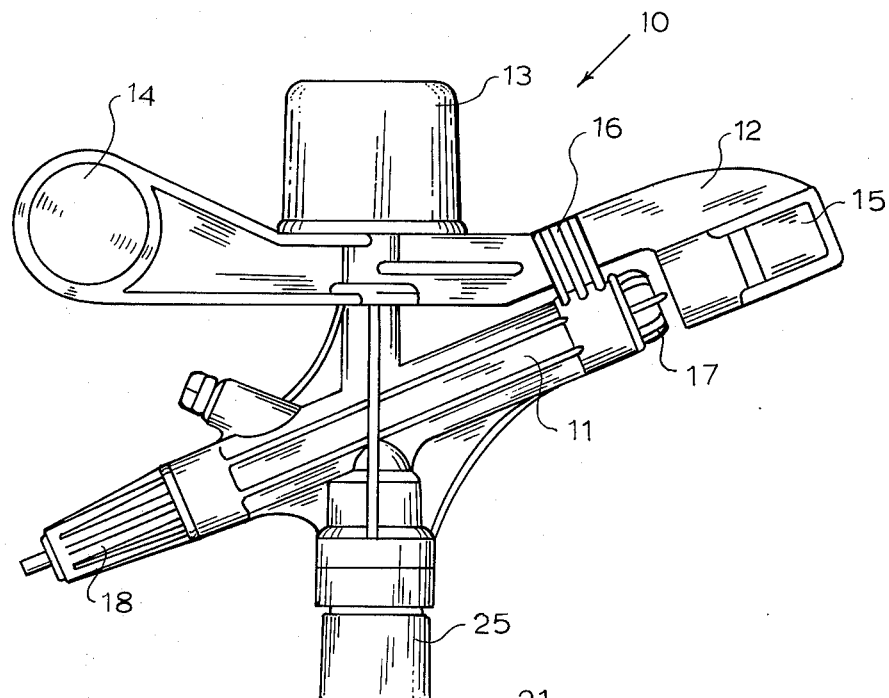
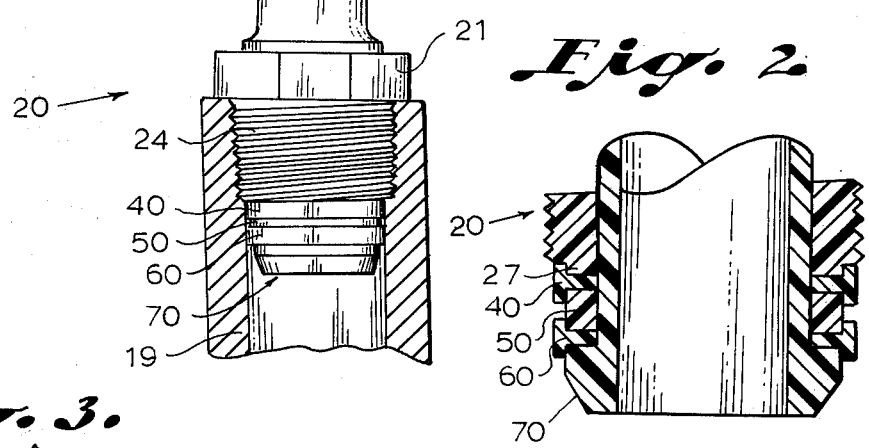
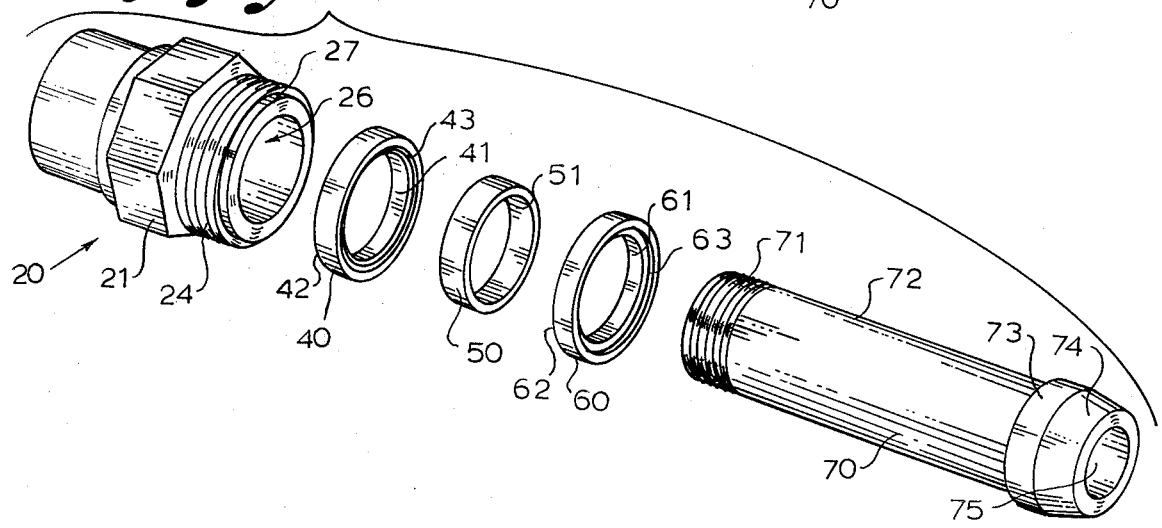

SPRINKLER HEAD BEARING MEANS

BACKGROUND OF THE INVENTION

1. Field of the Invention

This invention relates to sprinkler seals and more particularly to sprinkler seals in sprinklers having rotatable heads which are powered by the pressure of the water being used for irrigation.

2. Description of the Prior Art

Rotary head sprinklers, especially the impulse type step-by-step rotary sprinklers, have been used extensively in irrigation of agricultural fields such as orange groves, corn fields, and the like. In dry seasons these sprinklers may be used almost continuously to supply the moisture required for proper plant growth. Multiple sprinkler heads are frequently combined into large irrigation systems which are usually elevated above the crops to be irrigated. These irrigation systems are usually fed with river, lake, or well water which has been only coursely filtered to remove large objects. Quite often sand and other small particle matter is suspended in the irrigation water and transferred through the pipes to the sprinkler heads. The high pressure used in the sprinkler systems can easily force such particulate matter between the lower seal bearing surfaces of the rotating head sprinkler devices, thereby causing rapidly accelerated wearing characteristics of the bearing surfaces. When such rotary head sprinkler devices are manufactured of polymers or plastic material, this wear becomes even more untenable since the sprinkler heads cannot be replaced easily from their inaccessibly high mounting positions.

Previous inventors have attempted to shield the lower bearing seal which separates the spindle and swivel mechanisms, thereby permitting the use of ordinary flat washers. In U.S. Pat. No. 3,080,123, Erns uses a single washer which acts as a combined wear washer and seal. In U.S. Pat. Nos. 3,204,873 and 3,204,874, Senninger uses a single wear washer and a single seal which are both semi-shielded from the water flow. In U.S. Pat. No. 2,904,261, Johnson uses a single wear washer with two seals which are both semi-shielded from the water pressure. Other references include U.S. Pat. No. 2,869,925, Crow; U.S. Pat. No. 3,669,356, Senninger; U.S. Pat. No. 2,310,796, Lappin; U.S. Pat. No. 2,086,515, Evans; U.S. Pat. No. 1,501,718, Olschewski; U.S. Pat. No. 1,710,107, Orr; U.S. Pat. No. 2,256,737, Englehart; U.S. Pat. No. 2,110,112, Rippey; U.S. Pat. No. 2,792,256, Sinex; U.S. Pat. No. 3,033,469, Green; U.S. Pat. No. 3,043,552; Ryerson; U.S. Pat. No. 3,193,203, Crow; U.S. Pat. No. 2,993,649, Holz; U.S. Pat. No. 3,017,123, Rinkewich; and U.S. Pat. No. 2,878,062, Crow.

SUMMARY OF THE INVENTION

The present invention relates to a lower bearing seal for a rotatable sprinkler head having a swivel for connection to a source of water under pressure, a spindle movably mounted through a bore within the swivel, a wear washer located on the spindle and located between a flange section thereof and the swivel, a first seal located on the spindle between the swivel and the water washer, and a second seal located on the spindle between the flange section thereof and the wear washer. The first seal has on one side a first lip extending about the edge portion thereof for overlapping a coupling ridge on the swivel. The first seal also has a second lip extending about the edge portion of the opposite side thereof which couples with and overlaps the wear washer. The second seal has a first lip extending about the edge portion of one side thereof which overlaps and couples with the wear washer. The second seal also has a second lip extending about the edge portion of the opposite side thereof which overlaps and couples with the flange section of the spindle mechanism. This combination of overlapping washers protects the bearing surfaces from the entry of sand or other contaminants located external thereto.

BRIEF DESCRIPTION OF THE DRAWINGS

Other objects, features and advantages of this invention will be apparent from a study of the written description and the drawings in which:

FIG. 1 shows a front elevation of a sprinkler in accordance with one embodiment of the present invention. The front half of the irrigation water riser pipe is shown in a half section view to reveal more clearly the lower bearing seal.

FIG. 2 illustrates a sectional view of the lower bearing seal.

FIG. 3 shows an exploded, perspective view of the lower bearing seal, the spindle and the swivel.

DESCRIPTION OF THE PREFERRED EMBODIMENT

A rotary irrigation sprinkler 10 of the impulse arm step-by-step type is illustrated by FIG. 1 having a sprinkler head body 11 with an impulse arm 12 which is operated by a spring located under spring cover 13. Impulse arm 12 has a water engaging spoon on one end and an impulse arm counterweight 14 on the other end. A protruding member 16 is attached to the sprinkler body 11 for stopping the impulse arm 12 from proceeding past a certain point when the sprinkler is not in operation. The sprinkler head body 11 has a removable main nozzle 17 mounted on one end and a rear removable cap 18 mounted on the opposite end. The irrigation sprinkler assembly 10 is mounted to a riser pipe 19 by threaded section 24 of swivel device 20. The elements comprising the sprinkler lower bearing seal are located immediately below threaded section 24 of swivel device 20: first seal 40, wear washer 50, second seal 60 and spindle device 70.

Referring now to FIGS. 2 and 3, swivel device 20 has the form of a cylinder with one end 25 being tapered to a smaller diameter, a coaxially located hexnut section intermediate the ends thereof, and a threaded section 24 at the opposite end thereof, and a coaxial cylindrical bore 26 therethrough. A coaxial, protruding coupling ridge 27 having a diameter slightly smaller than the threaded section 24 is located on the threaded end of swivel device 20. Threaded section 24 is adapted to threadedly engage riser pipe 19 so as to form a watertight seal. The diameter of bore 26 is predetermined to provide a sliding fit when the main cylindrical section 72 of spindle 70 is inserted therethrough.

A first seal 40 consists of a generally cylindrical wafer section having a generally cylindrical, coaxial aperture 41 communicating between its first and second sides. The inside diameter of aperture 41 is predetermined to provide a sliding fit when first seal 40 is located on cylindrical section 72 of swivel 70. First seal 40 further includes a first lip 42 on the first side thereof having an inside diameter predetermined to provide a sliding fit when first seal 40 couples with coupling ridge 27 of swivel device 20. First seal 40 further includes a second lip 43 located on the second side thereof having an inside diameter predetermined to provide a sliding fit when second lip 43 of first seal 40 engages with and overlaps wear washer 50.

Wear washer 50 comprises a generally cylindrical wafer section having a generally cylindrical, coaxial aperture 51 communicating between its sides. The inside diameter of cylindrical aperture 51 is predetermined to provide a sliding fit when coupled to cylinrical section 72 of spindle 70. The outside diameter of wear washer 50 is predetermined to provide a sliding fit when coupled to second lip 43 of first seal 40 and first lip 62 of second seal 60. Second seal 60 consists of a generally cylindrical wafer section having a generally cylindrical, coaxial aperture communicating between first and second sides thereof. The inside diameter of cylindrical aperture 61 of second seal 60 has a diameter predetermined to provide a sliding fit when cylindrical surface 72 of spindle 70 is inserted therethrough. Second seal 60 has a first lip 62 on the first side thereof extending about the edge portion thereof. Lip 62 of second seal 60 has an inside diameter predetermined to provide a sliding fit when communicating with and overlapping with the outside surface of wear washer 50.

Second seal 60 further includes a second lip on the opposite side thereof extending about the edge portion thereof and having an inside diameter predetermined to provide a sliding fit when communicating with and overlapping annular section 73 of spindle 70.

Spindle 70 consists of a generally cylindrical body 72 having at one end threads 71 for engaging a suitably arranged receptacle within sprinkler head body 11, and at the opposite end an annular flange section 73 having a tapered end 74. Spindle 70 further includes a coaxial, generally cylindrical bore 75 communicating between its ends to provide a passageway for irrigating water being fed from riser pipe 19 to sprinkler head body 11.

Lip 43 of first seal 40 and lip 62 of second seal 60 each has a predetermined depth of slightly less than one-half the total thickness of wear washer 50, which allows lips 43 and 62 to overlap wear washer 50 without themselves touching. Lip 42 of first seal 40 has a predetermined depth allowing the engagement with and overlapping of coupling ridge 27 of swivel device 20 without interferring with the action of threads 24 in coupling with riser pipe 19. Lip 63 of second seal 60 has a predetermined depth allowing coupling with and overlapping of annular flange section 73 of spindle 70. The overlapping lip construction of first seal 40 and second seal 60 protect the rotational bearing surfaces of swivel device 27, wear washer 50 and spindle 70 from the entry of sand or other contaminants located external thereto, while still allowing the normal relative rotation of spindle 70 and swivel device 20.

The outside diameter of first seal 40, second seal 60 and annular flange 73 of spindle 70 are predetermined to provide a clearance fit when the lower bearing seal assembly is inserted within riser pipe 19.

In the preferred embodiment of the present invention the sprinkler head 10, swivel 20, spindle 70 and other associated sprinkler parts are molded from a rigid, high strength polymer. First seal 40 and second seal 60 are molded from a pliable, water-impregnable polymer. Wear washer 50 is molded from a high strength, rigid, solid lubricant impregnated polymer. The use of polymers in fabricating a longlasting lower bearing sprinkler seal is made possible by the protection provided by the overlapping seals against the incursion of sand and other contaminants between the rotatable bearing surfaces.

I claim:

1. A rotatable sprinkler head apparatus comprising in combination:

a swivel having attaching means for connection to a source of water under pressure, said swivel having a bore therethrough, and further having a coupling ridge on one end thereof;

spindle means movably mounted through said bore of said swivel and connected at one end to said sprinkler head apparatus, said spindle means having a flange at the opposite end thereof, and further having a bore between its ends;

wear washer means located on said spindle means and being located between said flange and said coupling ridge of said swivel;

a first seal located on said spindle means between said coupling ridge of said swivel and said wear washer means, said first seal having on one side thereof a first lip extending about the edge portion thereof overlapping said coupling ridge of said swivel, and first seal having a second lip extending about the edge portion thereof on the opposite side thereof and overlapping with said wear washer means;

a second seal located on said spindle means between said flange and said wear washer means, said second seal having a first lip on one side thereof extending about the edge portion thereof overlapping said wear washer means, with said second seal having further a second lip on the opposite side thereof extending about the edge portion thereof and overlapping said flange section of said spindle means, whereby surfaces of said wear washer, said spindle means, and said swivel are protected from the entry of sand or other contaminants.

2. An apparatus according to claim 1 in which said spindle means comprises a cylinder with one end thereof having an annular flange, said spindle means also having an axial, cylindrical bore communicating between its ends.

3. An apparatus according to claim 2 in which said swivel has a cylinder having a generally axial, cylindrical bore communicating between its ends, said swivel having a threaded portion adjacent to one end and having a coupling ledge adjacent said threaded portion and said end.

4. An apparatus according to claim 1 in which said wear washer comprises a generally cylindrical wafer section having a generally axial, cylindrical aperture intermediate its sides adapted to slidably communicate with said spindle means.

5. An apparatus according to claim 4 in which said first and second seals each have a generally cylindrical wafer section having an axial, cylindrical aperture intermediate its sides adapted to slidably communicate with said spindle means.

6. An apparatus according to claim 5 in which said first seal has generally annular first and second lips located on opposite sides thereof and extending about the edge portions thereof.

7. An apparatus according to claim 6 in which said second seal has generally annular first and second lips located on opposite sides thereof and extending about the edge portions thereof.

8. An apparatus according to claim 7 in which said second annular lip of said first seal and said first annular lip of said second seal have predetermined inner diameters adapted to overlap and slidably communicate with the external cylindrical surface of said wear washer means, whereby bearing surfaces of said wear washer means are protected from the entry of sand, abrasives or other contaminants.

9. An apparatus according to claim 8 in which said first annular lip of said first seal has a predetermined inner diameter adapted to overlap and slidably communicate with said coupling ridge of said swivel, whereby bearing surfaces of said swivel are protected from the entry of sand, abrasives and other contaminants.

10. An apparatus according to claim 9 in which said second annular lip of said second seal has a predetermined inner diameter adapted to overlap and slidably communiate with said annular flange of said spindle means whereby bearing surfaces of said spindle means are protected from the entry of sand, abrasives or other contaminants.

11. A rotatable sprinkler head apparatus comprising in combination:
  a swivel having a bore therethrough and having attaching means at a first end thereof for connection to a source of water under pressure;
  spindle means movably mounted through said bore of said swivel, said spindle means having an annular flange at a first end thereof adjacent said first end of said swivel, said spindle means further having a bore between its ends; and
  seal means located on said spindle means between said first end of said swivel and said annular flange of said spindle means, said seal means having multiple lips depending generally perpendicularly from an outer circumference thereof for overlapping with said first end of said swivel and said annular flange of said spindle means, whereby the communicating surfaces of said spindle means and said swivel are protected from the entry of sand, abrasives and other contaminates.

12. The apparatus according to claim 11 further including wear washer means located on said spindle means between said annular flange of said spindle means and said first end of said swivel, said wear washer means being at least partially overlapped by one of said lips depending from said seal means, whereby the communicating surfaces of said swivel, said spindle means, said wear washer means and said seal means are protected from the entry of sand, abrasives and other contaminates.

13. The apparatus according to claim 12 wherein said wear washer means is interposed between said annular flange of said spindle means and said seal means.

14. The apparatus according to claim 12 wherein said wear washer means is interposed between said first end of said swivel and said seal means.

15. The apparatus according to claim 14 wherein said wear washer means comprises an annular ridge coupled to end depending from said first end of said swivel.

16. The apparatus according to claim 14 wherein said wear washer means comprises an annular ring coupled to and depending from said first end to said swivel.

* * * * *